(12) United States Patent
Xie

(10) Patent No.: US 9,805,672 B2
(45) Date of Patent: Oct. 31, 2017

(54) LIQUID CRYSTAL DISPLAY PANEL AND DEVICE

(71) Applicants: SHENZHEN CHINA STAR OPTOELECTRONICS TECHNOLOGY CO., LTD., Shenzhen, Guangdong (CN); WUHAN CHINA STAR OPTOELECTRONICS TECHNOLOGY CO., LTD., Wuhan, Hubei (CN)

(72) Inventor: Chang Xie, Guangdong (CN)

(73) Assignees: SHENZHEN CHINA STAR OPTOELECTRONICS TECHNOLOGY CO., LTD., Shenzhen, Guangdong (CN); WUHAN CHINA STAR OPTOELECTRONICS TECHNOLOGY CO., LTD., Wuhan, Hubei (CN)

( * ) Notice: Subject to any disclaimer, the term of this patent is extended or adjusted under 35 U.S.C. 154(b) by 206 days.

(21) Appl. No.: 14/891,829

(22) PCT Filed: Sep. 21, 2015

(86) PCT No.: PCT/CN2015/090151
§ 371 (c)(1),
(2) Date: Nov. 17, 2015

(87) PCT Pub. No.: WO2017/045217
PCT Pub. Date: Mar. 23, 2017

(65) Prior Publication Data
US 2017/0263200 A1   Sep. 14, 2017

(30) Foreign Application Priority Data

Sep. 16, 2015  (CN) .......................... 2015 1 0589980

(51) Int. Cl.
G02F 1/1362 (2006.01)
G02F 1/1335 (2006.01)
(Continued)

(52) U.S. Cl.
CPC ....... G09G 3/3614 (2013.01); G02F 1/13338 (2013.01); G02F 1/13394 (2013.01);
(Continued)

(58) Field of Classification Search
CPC ......... G02F 1/136204; G02F 1/133514; G02F 1/133512; G02F 1/1339; G02F 1/13394;
(Continued)

(56) References Cited

U.S. PATENT DOCUMENTS

2006/0097975 A1* 5/2006 Lee ..................... G02F 1/13338
345/98
2007/0195029 A1* 8/2007 Jeon .................... G02F 1/13338
345/87

(Continued)

*Primary Examiner* — Jia Pan
(74) *Attorney, Agent, or Firm* — Ladas & Parry LLP

(57) ABSTRACT

A liquid crystal display (LCD) panel and an LCD device are provided. The panel has: a first transparent conductive layer configured to introduce a first polarity electric charge accumulated on a first substrate, a second transparent conductive layer configured to introduce a second polarity electric charge accumulated on a second substrate, and a connecting component disposed on the first substrate and/or the second substrate. Only when pressing the liquid crystal display panel, the first transparent conductive layer and the second transparent conductive layer are electrically connected to each other by the connecting component.

16 Claims, 2 Drawing Sheets

(51) Int. Cl.
*G02F 1/1339* (2006.01)
*G02F 1/1333* (2006.01)
*G02F 1/1343* (2006.01)
*G09G 3/36* (2006.01)

(52) U.S. Cl.
CPC .. *G02F 1/133512* (2013.01); *G02F 1/133514* (2013.01); *G02F 1/134309* (2013.01); *G02F 1/136204* (2013.01); *G02F 2001/133397* (2013.01); *G02F 2201/121* (2013.01); *G02F 2201/123* (2013.01)

(58) Field of Classification Search
CPC ....... G02F 2001/13396; G02F 1/13392; G02F 1/0107; G02F 1/13338; G02F 2001/133397; G06F 2203/04103; G06F 2203/04111; G06F 3/0412; G06F 3/044
See application file for complete search history.

(56) References Cited

U.S. PATENT DOCUMENTS

| | | | | |
|---|---|---|---|---|
| 2007/0262967 | A1* | 11/2007 | Rho | G02F 1/13338 345/173 |
| 2010/0033448 | A1* | 2/2010 | Koito | G06F 3/0412 345/174 |
| 2010/0156827 | A1* | 6/2010 | Joo | G02F 1/13338 345/173 |
| 2011/0102698 | A1* | 5/2011 | Wang | G02F 1/13338 349/54 |
| 2013/0176235 | A1* | 7/2013 | Chou | G06F 3/0412 345/173 |

* cited by examiner

LIQUID CRYSTAL DISPLAY PANEL AND DEVICE

FIELD OF THE INVENTION

The present invention relates to a technological field of liquid crystal displays, and more particularly to a liquid crystal display (LCD) panel and an LCD device.

BACKGROUND OF THE INVENTION

In recent years, people widely pay close attention to the properties and quality of liquid crystal displays. During the manufacturing process, some electric charge ions remain within a liquid crystal display panel.

FIG. 1 is a structural schematic view of a conventional liquid crystal display panel. As shown in FIG. 1, a liquid crystal display panel 10 commonly comprises two glass substrates 11 and 12. During display, the electric charge ions are accumulated on the inner sides of the two substrates caused by the electric field, and when the electric voltage is removed, the remaining electric charge ions generate a certain electric field, which causes the liquid crystal display panel to still display a previous image, namely a ghost shadow, so that the viewing quality is influenced, and the display effect is decreased.

Hence, it is necessary to provide a liquid crystal display (LCD) and an LCD device which solve the problems existing in the conventional technologies.

SUMMARY OF THE INVENTION

The object of the present invention is to provide a liquid crystal display (LCD) panel and an LCD device, so as to solve a technical problem that since electric charges accumulate on inner sides of two substrates in the manufacturing process, the electric charges generate an electric field during the display, causing a ghost shadow phenomenon.

For solving the above-mentioned technical problems, the present invention constructs a liquid crystal display panel, which comprises:

a first substrate including a first transparent conductive layer positioned on an inner side of the first substrate, wherein the inner side is a side close to a liquid crystal layer, and the first transparent conductive layer is configured to introduce a first polarity electric charge accumulated on the first substrate;

the liquid crystal layer disposed between the first substrate and a second substrate; and the second substrate disposed opposite to the first substrate and including a second transparent conductive layer positioned on an inner side of the second substrate, wherein the second transparent conductive layer is configured to introduce a second polarity electric charge accumulated on the second substrate;

wherein a connecting component is disposed on the first substrate and/or the second substrate; and only when pressing the liquid crystal display panel, the first transparent conductive layer and the second transparent conductive layer are electrically connected to each other by the connecting component;

wherein the connecting component is a protrusion, and the material of the protrusion is resin.

In the liquid crystal display panel according the present invention, the first transparent conductive layer and/or the second transparent conductive layer extend to cover the protrusion.

In the liquid crystal display panel according the present invention, the connecting component includes a first protrusion and a second protrusion corresponding to each other, wherein the first protrusion is disposed on the first substrate, and the second protrusion is disposed on the second substrate;

wherein the first transparent conductive layer is positioned on the first protrusion and the inner side of the first substrate uncovered by the first protrusion; and wherein the second transparent conductive layer is positioned on the second protrusion and the inner side of the second substrate uncovered by the second protrusion.

In the liquid crystal display panel according the present invention, the liquid crystal display panel includes a display area configured to display image signals; and the connecting component is positioned out of the display area.

In the liquid crystal display panel according the present invention, the first substrate is provided with a black matrix, a color resist layer and common electrodes, and the first transparent conductive layer is positioned on an outside of the common electrodes; and wherein the second substrate is provided with a switch array layer and pixel electrodes, and the second transparent conductive layer is positioned on an outside of the pixel electrodes.

In the liquid crystal display panel according the present invention, the liquid crystal display panel includes a display area, and the connecting component is disposed at a position which aligns to the black matrix.

In the liquid crystal display panel according the present invention, a first insulation layer is disposed between the first transparent conductive layer and the common electrodes.

In the liquid crystal display panel according the present invention, a second insulation layer is disposed between the second transparent conductive layer and the pixel electrodes.

In the liquid crystal display panel according the present invention, the connecting component and spacers positioned between the first substrate and the second substrate are formed by an identical process.

For solving the above-mentioned technical problems, the present invention constructs a liquid crystal display panel, which comprises:

a first substrate including a first transparent conductive layer positioned on an inner side of the first substrate, wherein the inner side is a side close to a liquid crystal layer, and the first transparent conductive layer is configured to introduce a first polarity electric charge accumulated on the first substrate;

the liquid crystal layer disposed between the first substrate and a second substrate; and a second substrate disposed opposite to the first substrate and including a second transparent conductive layer positioned on an inner side of the second substrate, wherein the second transparent conductive layer is configured to introduce a second polarity electric charge accumulated on the second substrate;

wherein a connecting component is disposed on the first substrate and/or the second substrate; and only when pressing the liquid crystal display panel, the first transparent conductive layer and the second transparent conductive layer are electrically connected to each other by the connecting component.

In the liquid crystal display panel according the present invention, the connecting component is a protrusion, and the first transparent conductive layer and/or the second transparent conductive layer extend to cover the protrusion.

In the liquid crystal display panel according the present invention, the material of the protrusion is resin.

In the liquid crystal display panel according the present invention, the connecting component include a first protrusion and a second protrusion corresponding to each other, wherein the first protrusion is disposed on the first substrate, and the second protrusion is disposed on the second substrate;

wherein the first transparent conductive layer is positioned on the first protrusion and the inner side of the first substrate uncovered by the first protrusion; and wherein the second transparent conductive layer is positioned on the second protrusion and the inner side of the second substrate uncovered by the second protrusion.

In the liquid crystal display panel according the present invention, the liquid crystal display panel includes a display area configured to display image signals; and the connecting component is positioned out of the display area.

In the liquid crystal display panel according the present invention, the first substrate is provided with a black matrix, a color resist layer and common electrodes, and the first transparent conductive layer is positioned on an outside of the common electrodes; and wherein the second substrate is provided with a switch array layer and pixel electrodes, and the second transparent conductive layer is positioned on an outside of the pixel electrodes.

In the liquid crystal display panel according the present invention, the liquid crystal display panel includes a display area, and the connecting component is disposed at a position which aligns to the black matrix.

In the liquid crystal display panel according the present invention, a first insulation layer is disposed between the first transparent conductive layer and the common electrodes.

In the liquid crystal display panel according the present invention, a second insulation layer is disposed between the second transparent conductive layer and the pixel electrodes.

In the liquid crystal display panel according the present invention, the connecting component and spacers positioned between the first substrate and the second substrate are formed by the same process.

The present invention further provides a liquid crystal display device, which comprises a backlight module and any one of the above-mentioned liquid crystal display panels.

In the liquid crystal display panel (LCD) and the LCD device according to the present invention, by adding two conductive layers on the inner sides of the two substrates and adding connecting component between the two substrates, the two conductive layers can be electrically connected to each other only when the liquid crystal display panel is pressed, so that the electric charge ions remained on the substrates are neutralized, so as to prevent a ghost shadow being generated, and the display effect and quality are increased.

DETAILED DESCRIPTION OF THE PREFERRED EMBODIMENTS

Figure 1:
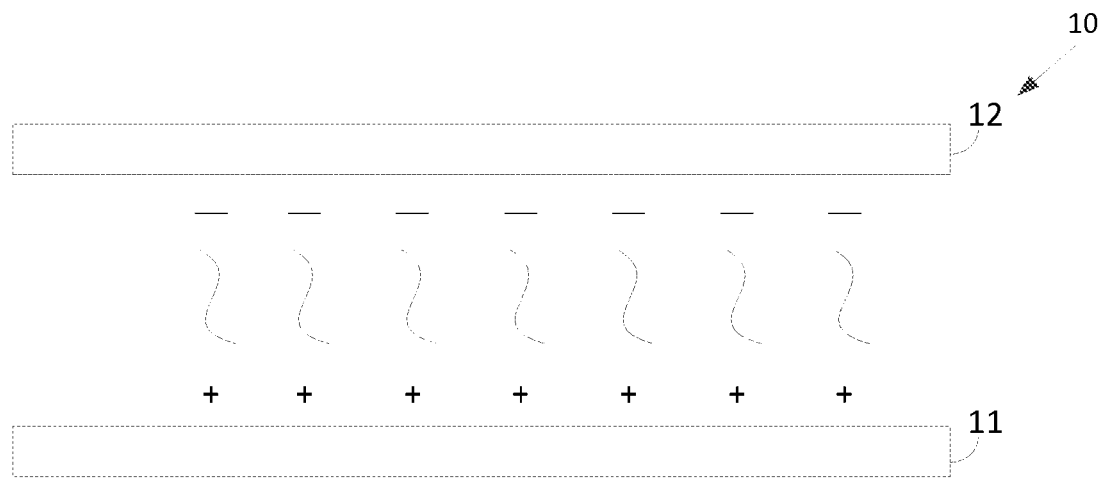
FIG. 1 is a structural schematic view of a conventional liquid crystal display panel.

The foregoing objects, features, and advantages adopted by the present invention can be best understood by referring to the following detailed description of the preferred embodiments and the accompanying drawings. Furthermore, the directional terms described in the present invention, such as upper, lower, front, rear, left, right, inner, outer, side, etc., are only directions with reference to the accompanying drawings, so that the used directional terms are used to describe and understand the present invention, but the present invention is not limited thereto. In the drawings, units with similar structures use the same numerals.

Figure 2:
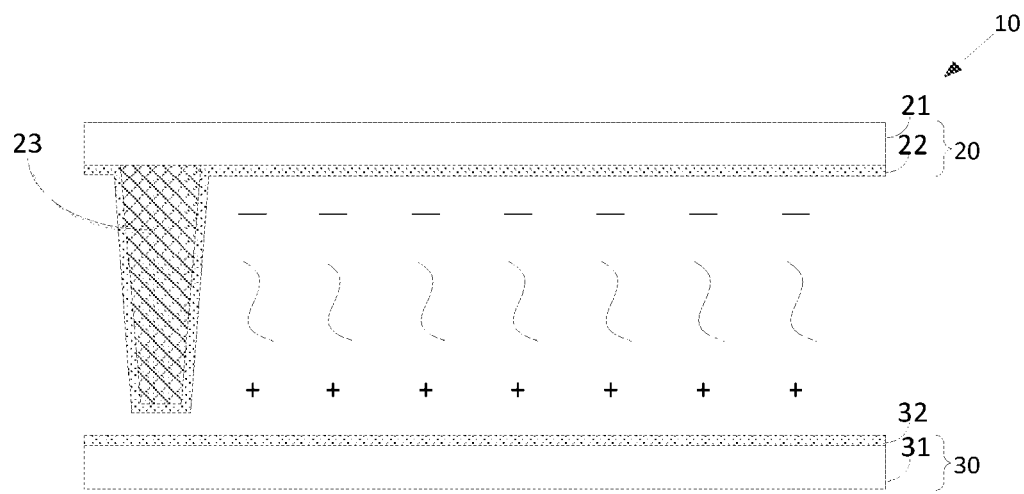
FIG. 2 is a structural schematic view of a first kind of liquid crystal display panel according to the present invention.

Refer now to FIG. 2, which is a structural schematic view of a first kind of liquid crystal display panel according to the present invention.

As shown in FIG. 2, a liquid crystal display panel 10 according to the present invention comprises a first substrate 20, a liquid crystal layer, and a second substrate 30. The first substrate 20 can be a color filter substrate, and the second substrate 30 can be an array substrate.

The first substrate 20 includes a first substrate base plate 21 and a first transparent conductive layer 22, wherein the first transparent conductive layer 22 is positioned on an inner side of the first substrate 20, and the inner side is the side close to the liquid crystal layer. The first transparent conductive layer 22 is configured to introduce a first polarity electric charge accumulated on the first substrate (such as a negative polarity remained electric charge); the liquid crystal layer is positioned between the first substrate 20 and the second substrate 30.

The second substrate 30 is disposed opposite the first substrate 20, and the second substrate 30 includes a second substrate base plate 31 and a second transparent conductive layer 32, wherein the second transparent conductive layer 32 is positioned on an inner side of the second substrate 30. The second transparent conductive layer 32 is configured to introduce a second polarity electric charge (such as a positive polarity remained electric charge) accumulated on the second substrate.

Figure 3:
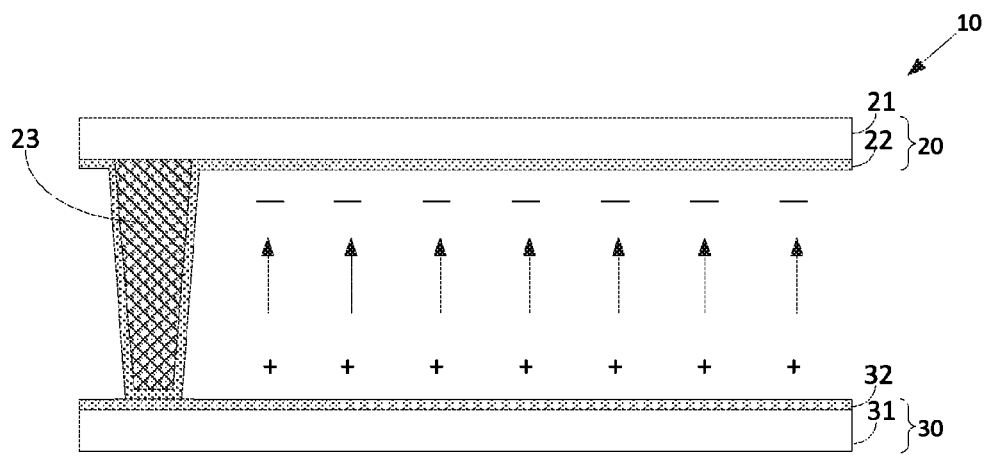
FIG. 3 is a structural schematic view of the first kind of liquid crystal display panel according to the present invention when it is pressed.

A connecting component 23 is disposed on the first substrate 20, but the connecting component 23 can also be disposed on the second substrate 30, certainly. Only when pressing the liquid crystal display panel 10, as shown in FIG. 3, the first transparent conductive layer 22 and the second transparent conductive layer 32 are electrically connected to each other by the connecting component 23. Certainly, the connecting component 23 is not limited by the format thereof in FIG. 2.

When pressing the liquid crystal display panel 10 according to the present invention, the connecting component 23 touches the second substrate 30, namely the first transparent conductive layer 22 and the second transparent conductive layer 32 are electrically connected. Therefore, positive and negative remained electric charges accumulated on the first substrate 20 and the second substrate 30 are neutralized, so as to prevent a ghost shadow being generated, and the display effect and quality are increased.

The first substrate 20 can further be provided with a black matrix (not shown), a color resist layer (not shown), and a third transparent conductive layer (not shown). The color resist layer is positioned on the first substrate base plate 21, and the color resist layer includes red color resists, green color resists, and blue color resists. The black matrix is positioned between two adjacent color resists. The third transparent conductive layer is positioned on the color resist layer, and the third transparent conductive layer includes common electrodes. The first transparent conductive layer is positioned on an outside of the third transparent conductive layer (namely the first transparent conductive layer is more close to the liquid crystal layer). A first insulation layer further be disposed between the first transparent conductive layer and the third transparent conductive layer.

The second substrate 30 further can be provided with a switch array layer (not shown) and a fourth transparent conductive layer (not shown). The switch array layer is positioned on the second substrate base plate 31, and the switch array layer includes a plurality of thin film transistors (not shown). The fourth transparent conductive layer is positioned on the switch array layer, and the fourth transparent conductive layer includes pixel electrodes. The second transparent conductive layer is positioned on an outside of the fourth transparent conductive layer (namely the second transparent conductive layer is closer to the liquid crystal layer). A second insulation layer can further be disposed between the second transparent conductive layer and the fourth transparent conductive layer.

Because the black matrix, the color resist layer, the third transparent conductive layer shown by the common electrodes, the switch array layer, and the fourth transparent conductive layer shown by the pixel electrodes are all conventional technologies, they are not further explained here.

Preferably, as shown in FIG. 2, the connecting component 23 is a protrusion, and the protrusion can be disposed on the first substrate 20 or the he second substrate 30. If the protrusion is positioned on the first substrate 20, the first transparent conductive layer 22 extends to cover the protrusion.

Certainly, the protrusion can be positioned on the second substrate 30, and then the second transparent conductive layer 32 extends to cover the protrusion.

Preferably, the material of the protrusion is resin. The resin material is a common material in the liquid crystal display panel, so that it can simplify the manufacturing process and lower the cost by using such material.

Preferably, image signals are inputted into the liquid crystal display panel, and the liquid crystal display panel includes a display area used to display the image signals. The connecting component 23 is positioned out of the display area, so as to prevent the connecting component influencing an aperture opening ratio of the panel. The connecting component can be positioned inside of the display area, and the connecting component is disposed at a position which is corresponding to the black matrix, preferably the position which aligns to the black matrix. If the connecting component 23 is a protrusion, the material of the connecting component 23 is preferably a transparent resin.

Preferably, the connecting component 23 can be formed by an identical process of producing spacers (not shown) of the liquid crystal display panel, so that additional processes and costs are unnecessary. The spacers are used to keep a certain distance between the first substrate and the second substrate.

Figure 4:
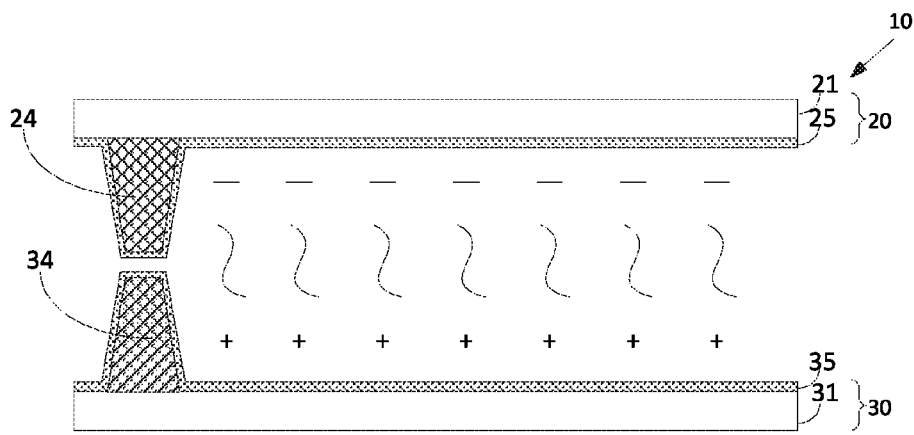
FIG. 4 is a structural schematic view of a second kind of liquid crystal display panel according to the present invention.

Refer now to FIG. 4, which is a structural schematic view of a second kind of liquid crystal display panel according to the present invention.

As shown in FIG. 4, in the liquid crystal display panel 10, the first substrate 20, and the second substrate 30 are respectively provided with protrusions. That is, the connecting component include a first protrusion 24 and a second protrusion 34. The first protrusion 24 is disposed on the first substrate 20. The first transparent conductive layer 25 is positioned on the first protrusion 24 and the inner side of the first substrate 20 uncovered by the first protrusion 24.

The second transparent conductive layer 35 is positioned on the second protrusion 34 and the inner side of the second substrate 30 uncovered by the second protrusion 34.

Figure 5:
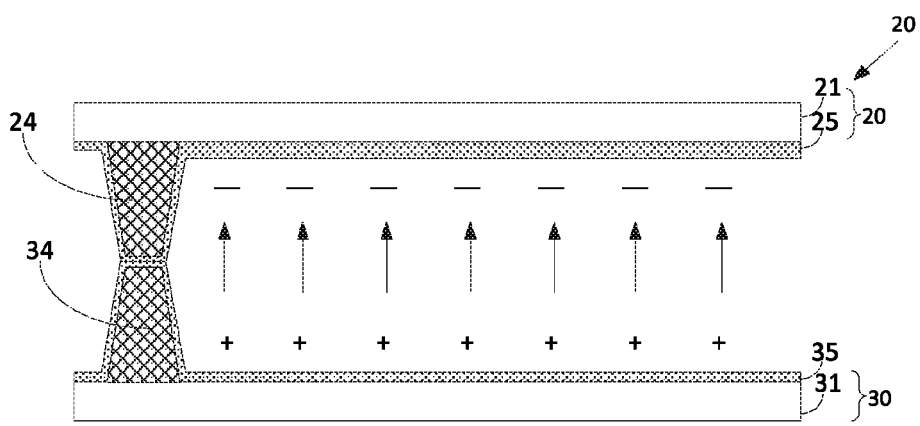
FIG. 5 is a structural schematic view of the second kind of liquid crystal display panel according to the present invention when it is pressed.

When pressing the liquid crystal display panel 10, as shown in FIG. 5, the first protrusion 24 touches the second protrusion 34, so that the first transparent conductive layer 25 and the second transparent conductive layer 35 are electrically connected. Certainly, the shapes of the first protrusion 24 and the second protrusion 34 are not limited by the structures shown in FIG. 4, any other structure which can achieve the object of the present invention is suitable to be used in the present invention.

For example, when people use a display device such as a mobile phone or a tablet PC, a pressure produced by touching with a finger will make the upper and lower protrusions contact. The positive or negative electric charges of the upper and lower substrates generate an electric charges neutralization by the conductive layers of the protrusions.

Because each of the two substrates of the liquid crystal display panel according the present invention having the protrusions disposed thereon, only when pressing, the two transparent conductive layers are electrically connected, the positive and negative remained electric charges accumulated on the first substrate and the second substrate are neutralized, so as to prevent a ghost shadow being generated, and the display effect and quality are increased.

The present further provides a liquid crystal display device, which comprises a back light module (not shown) and the liquid crystal display panel 10 of the above-mentioned embodiments.

In this embodiment, the liquid crystal display panel 10 is such as shown in FIGS. 2 to 5, and the specific structures are the same with the foregoing embodiments, so they are not described again here.

In the liquid crystal display (LCD) panel and an LCD device according to the present invention, by adding two conductive layers on the inner sides of the two substrates, and adding connecting component between the two substrates, the two conductive layers are electrically connected to each other only when the liquid crystal display panel is pressed, so that the electric charge ions remained on the substrates are neutralized, so as to prevent a ghost shadow being generated, and the display effect and quality are increased.

The present invention has been described with preferred embodiments thereof and it is understood that many changes and modifications to the described embodiment can be carried out without departing from the scope and the spirit of the invention that is intended to be limited only by the appended claims.

The invention claimed is:
1. A liquid crystal display panel, comprising:
 a first substrate including a first transparent conductive layer positioned on an inner side of the first substrate close to a liquid crystal layer, wherein the first trans- parent conductive layer is configured to introduce a first polarity electric charge accumulated on the first substrate;

the liquid crystal layer disposed between the first substrate and a second substrate; and the second substrate disposed opposite to the first substrate and including a second transparent conductive layer positioned on an inner side of the second substrate, wherein the second transparent conductive layer is configured to introduce a second polarity electric charge accumulated on the second substrate;

wherein a connecting component is disposed on the first substrate and/or the second substrate; and only when pressing the liquid crystal display panel, the first transparent conductive layer and the second transparent conductive layer are electrically connected to each other by the connecting component;

wherein the connecting component is a protrusion, and the material of the protrusion is resin, wherein the liquid crystal display panel includes a display area configured to display image signals; and the connecting component is positioned out of the display area.

2. The liquid crystal display panel according to claim 1, wherein the first transparent conductive layer and/or the second transparent conductive layer extend to cover the protrusion.

3. The liquid crystal display panel according to claim 1, wherein the connecting component include a first protrusion and a second protrusion corresponding to each other, wherein the first protrusion is disposed on the first substrate, and the second protrusion is disposed on the second substrate;

wherein the first transparent conductive layer is positioned on the first protrusion and the inner side of the first substrate uncovered by the first protrusion; and wherein the second transparent conductive layer is positioned on the second protrusion and the inner side of the second substrate uncovered by the second protrusion.

4. The liquid crystal display panel according to claim 1, wherein the first substrate is provided with a black matrix, a color resist layer and common electrodes, and the first transparent conductive layer is positioned on an outside of the common electrodes; and wherein the second substrate is provided with a switch array layer and pixel electrodes, and the second transparent conductive layer is positioned on an outside of the pixel electrodes.

5. The liquid crystal display panel according to claim 4, wherein a first insulation layer is disposed between the first transparent conductive layer and the common electrodes.

6. The liquid crystal display panel according to claim 4, wherein a second insulation layer is disposed between the second transparent conductive layer and the pixel electrodes.

7. The liquid crystal display panel according to claim 1, wherein the connecting component and spacers positioned between the first substrate and the second substrate are formed by an identical process.

8. A liquid crystal display panel, comprising:
a first substrate including a first transparent conductive layer positioned on an inner side of the first substrate close to a liquid crystal layer, wherein the first transparent conductive layer is configured to introduce a first polarity electric charge accumulated on the first substrate;

the liquid crystal layer disposed between the first substrate and a second substrate; and the second substrate disposed opposite to the first substrate and including a second transparent conductive layer positioned on an inner side of the second substrate, wherein the second transparent conductive layer is configured to introduce a second polarity electric charge accumulated on the second substrate;

wherein a connecting component is disposed on the first substrate and/or the second substrate; and only when pressing the liquid crystal display panel, the first transparent conductive layer and the second transparent conductive layer are electrically connected to each other by the connecting component;

wherein the connecting component is a protrusion, wherein the liquid crystal display panel includes a display area configured to display image signals; and the connecting component is positioned out of the display area.

9. The liquid crystal display panel according to claim 8, wherein the first transparent conductive layer and/or the second transparent conductive layer extend to cover the protrusion.

10. The liquid crystal display panel according to claim 9, wherein the material of the protrusion is resin.

11. The liquid crystal display panel according to claim 8, wherein the connecting component include a first protrusion and a second protrusion corresponding to each other, wherein the first protrusion is disposed on the first substrate, and the second protrusion is disposed on the second substrate;

wherein the first transparent conductive layer is positioned on the first protrusion and the inner side of the first substrate uncovered by the first protrusion; and wherein the second transparent conductive layer is positioned on the second protrusion and the inner side of the second substrate uncovered by the second protrusion.

12. The liquid crystal display panel according to claim 8, wherein the first substrate is provided with a black matrix, a color resist layer and common electrodes, and the first transparent conductive layer is positioned on an outside of the common electrodes; and wherein the second substrate is provided with a switch array layer and pixel electrodes, and the second transparent conductive layer is positioned on an outside of the pixel electrodes.

13. The liquid crystal display panel according to claim 12, wherein a first insulation layer is disposed between the first transparent conductive layer and the common electrodes.

14. The liquid crystal display panel according to claim 12, wherein a second insulation layer is disposed between the second transparent conductive layer and the pixel electrodes.

15. The liquid crystal display panel according to claim 8, wherein the connecting component and spacers positioned between the first substrate and the second substrate are formed by an identical process.

16. A liquid crystal display device, comprising a backlight module, and the liquid crystal display panel according to claim 8.

* * * * *